United States Patent [19]
Itoh et al.

[11] Patent Number: 5,429,219
[45] Date of Patent: Jul. 4, 1995

[54] ROTATION TRANSMISSION DEVICE

[75] Inventors: Kenichiro Itoh, Shizuoka; Makoto Yasui, Iwata, both of Japan

[73] Assignee: NTN Corporation, Osaka, Japan

[21] Appl. No.: 253,557

[22] Filed: Jun. 3, 1994

[30] Foreign Application Priority Data

Jun. 8, 1993 [JP] Japan .................. 5-137581

[51] Int. Cl.[6] ............... F16D 15/00; F16D 43/20
[52] U.S. Cl. ................ 192/48.92; 192/38; 192/45.1; 188/134; 464/146
[58] Field of Search ............ 192/48.92, 38, 37, 43.1, 192/45.1; 188/134; 464/140, 146

[56] References Cited

U.S. PATENT DOCUMENTS

| | | | |
|---|---|---|---|
| 4,901,831 | 2/1990 | Ito et al. | 192/38 |
| 5,016,740 | 5/1991 | Ito et al. | 192/38 |
| 5,135,084 | 8/1992 | Ito et al. | 192/38 |

FOREIGN PATENT DOCUMENTS

436270A1 7/1991 European Pat. Off. .

*Primary Examiner*—Andrea L. Pitts
*Attorney, Agent, or Firm*—Nikaido, Marmelstein, Murray & Oram

[57] ABSTRACT

A large-diameter retainer and a small-diameter retainer for retaining sprags are mounted between the inner member as the driving member and the outer ring as the driven member. The large-diameter retainer is coupled with the inner member with a play in the direction of rotation. A switch spring is attached to one end of both of the retainers. To the other end, a turning effort imparting mechanism is coupled through a one-way clutch. The outer ring is coupled with the output shaft with a play in the direction of rotation which is set to be larger than the abovesaid play. When the inner member rotates, the large-diameter retainer will rotate first to tilt the sprags. After the play in the direction of rotation has disappeared, the coupling member between the outer ring and the output shaft will rotate. Thus, the sprags are always brought to correct ready-to-engage positions.

3 Claims, 18 Drawing Sheets

ROTATION TRANSMISSION DEVICE

BACKGROUND OF THE INVENTION

This invention relates to a rotation transmission device used on a four-wheel drive vehicle and capable of selectively transmitting the driving force for acceleration and cutting off the transmission when brakes are applied.

FIG. 23 shows a conventional rotation transmission device employing a mechanical clutch mounted on the drive train of a four-wheel drive vehicle and is capable of selectively transmitting the driving force to the driven wheels and cutting it off (Japanese Unexamined Patent Publication No. 5-118358).

This device comprises an outer ring 101 as a driven member, an inner member 102 as a driving member rotatably mounted in the outer ring 101, a large-diameter retainer 103 and a small-diameter retainer 104 mounted between the outer ring 101 and the inner member 102, and sprags 105 as engaging elements received in pockets formed in the retainers 103, 104 and adapted to engage the outer ring 101 and the inner member 102 together.

The large-diameter retainer 103 is coupled through pins 106 to the inner member 102 and the small-diameter retainer 104 with gaps left therebetween in the direction of rotation. To a tubular member 110 coupled to the pin 106 is coupled an elastic member 107 for imparting a turning effort to the retainer 103 from one direction.

To the end of the tubular member 110 is coupled a turning effort imparting means 109 for imparting a turning effort to the retainer 103 from the direction opposite to the direction of turning effort applied by the elastic member 107. When the rotational direction of the inner member 102 is reversed, a one-way clutch 108 is adapted to engage or disengage, thus changing over the direction of turning effort applied to the large-diameter retainer 103.

This device B may be mounted alone on the propeller shaft for driving the rear wheel or front wheel as shown in FIGS. 19 and 20 or it may be mounted together with a differential device such as a center differential or a limited slip differential device H as shown in FIG. 21.

In the driving mechanism shown in FIG. 19, while the vehicle is moving forward climbing a slope, the two retainers 103, 104 move relative to each other to the positions shown in FIG. 24, thereby moving the sprags to a position where they are ready to engage. Now let us suppose that the vehicle is brought to a stop while climbing a slope and then begins to move backward down the slope by gravity with the transmission in the neutral position. If a play formed in the rotational direction between the front wheels→ front differential E→ rotation transmission device B is smaller than the play formed in the rotational direction between the rear wheels→ rear differential F→ transfer C→ rotation transmission device B, the outer ring 101 of the rotation transmission device B, which is coupled to the front wheels, will begin to rotate before does the inner member 102.

In this case, the sprags 105 are held by the large-diameter retainer 103 in the forward-travel ready-to-engage position as shown in FIG. 24. If the outer ring 101 begins to rotate backward in this state, the sprags 105 will engage both the outer ring 101 and inner member 102. Once these members engage one another, it is impossible to change over the position of the large-diameter retainer 103 even if the inner member 102 is rotated thereafter. The front wheels and the rear wheels are thus directly connected together. If the vehicle turns a tight corner in this state, a braking phenomenon will occur at a tight corner.

The driving mechanism shown in FIG. 20 has a similar problem. Namely, if the rotational-direction play between the rear wheels and the transmission device is smaller than the play between the front wheels and the transmission device, it is difficult to smoothly change over the position of the large-diameter retainer. The sprags are thus often left inclined in the direction opposite to the desired direction. If this happens, the inner member 102 and the outer ring 101 are coupled together.

OBJECTS AND SUMMARY OF THE INVENTION

An object of this invention is to provide a rotation transmission device which solves this problem.

In order to solve this problem, according to this invention, there is provided a rotation transmission device comprising a driving member coupled to an input shaft and a driven member coupled to an output shaft, one of the driving member and the driven member mounted around the other so as to be rotatable relative to each other, a plurality of engaging elements mounted between the driving member and driven member and adapted to engage and lock both the driving and driven members together when the driving member and the driven member rotate relative to each other in either direction, a retainer means for keeping the engaging elements circumferentially spaced apart a predetermined distance from each other, the retainer means being coupled to the driving member so as to rotate together with the driving member, with a play in the circumferential direction left between the entire portion or a part of the retainer means and the driving member to allow them to rotate relative to each other, two turning effort imparting means for imparting turning efforts to the retainer means from opposite directions, and a changeover means for changing over the direction of the turning effort applied to the retainer means according to the direction of rotation of the driving member, characterized in that the driven member is coupled to an output shaft with a play left therebetween in the direction of rotation, the play between the driven member and the output shaft being larger than the play between the retainer means and the driving member.

When the driving member begins to rotate in either direction, the retainer does not rotate together with the driving member but begins to rotate only after a certain time lag due to the turning effort applied thereto by the turning effort imparting means. The engaging elements are thus moved to their ready-to-engage position. When the driving member rotate in this state, the engaging elements firstly engage the driving member and the driven member. When the driving member rotates further, the play in the rotational direction between the driven member and the output shaft will disappear, allowing the transmission of torque to the output shaft.

Since a play in the direction of rotation is provided between the driven member and the output shaft, when the direction of rotation has changed, firstly the engaging elements move to the correct ready-to-engage position. Then, the torque is transmitted to the output shaft. Thus, it is assured that the engaging elements be moved to the correct ready-to-engage position with respect to the direction of rotation at the input side. Namely, they are never moved to the wrong engaging position. Thus, the transmission of driving force can be changed over reliably and stably.

BRIEF DESCRIPTION OF THE DRAWINGS

Other features and objects of the present invention will become apparent from the following description made with reference to the accompanying drawings, in which.

DETAILED DESCRIPTION OF PREFERRED EMBODIMENTS

FIGS. 1-9 show the first embodiment of this invention.

As shown in the figures, an outer ring 1 is coupled to an output shaft, while an inner member 2 coupled to an input shaft is rotatably mounted in the outer ring 1 through bearings 3. An input ring 4 is coupled to one end of the inner member 2 through splines.

Figure 2:
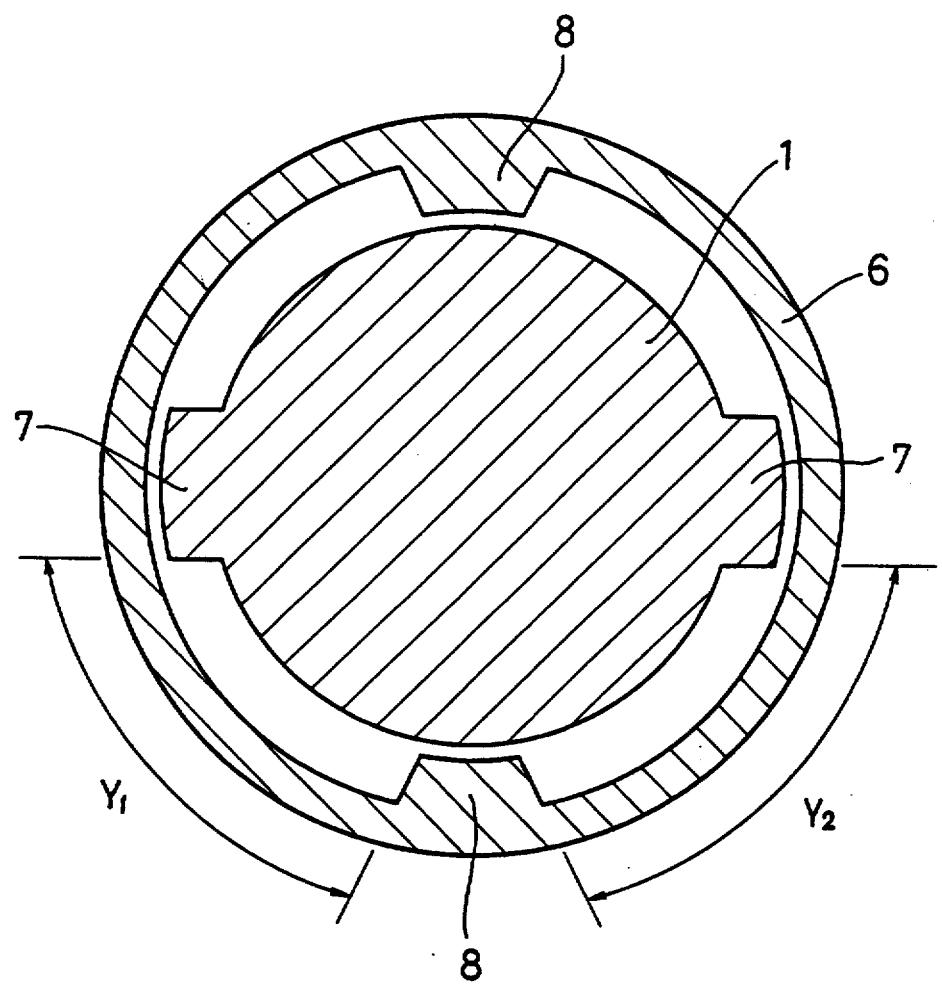
FIG. 2 is a sectional view taken along line II—II of FIG. 1.

A coupling member 6 is rotatably mounted on the outer end of the outer ring 1 through a bearing 5. A plurality of protrusions 7 and 8 are provided on the outer periphery of the outer ring 1 and the inner periphery of the coupling member 6, respectively (FIG. 2). The adjacent protrusions 7 and 8 are spaced apart from each other in the direction of rotation by plays Y (Y=Y1+Y2). Thus, the outer ring 1 and the coupling member 6 are adapted to be brought into engagement with each other with the plays Y left therebetween.

Figure 3:
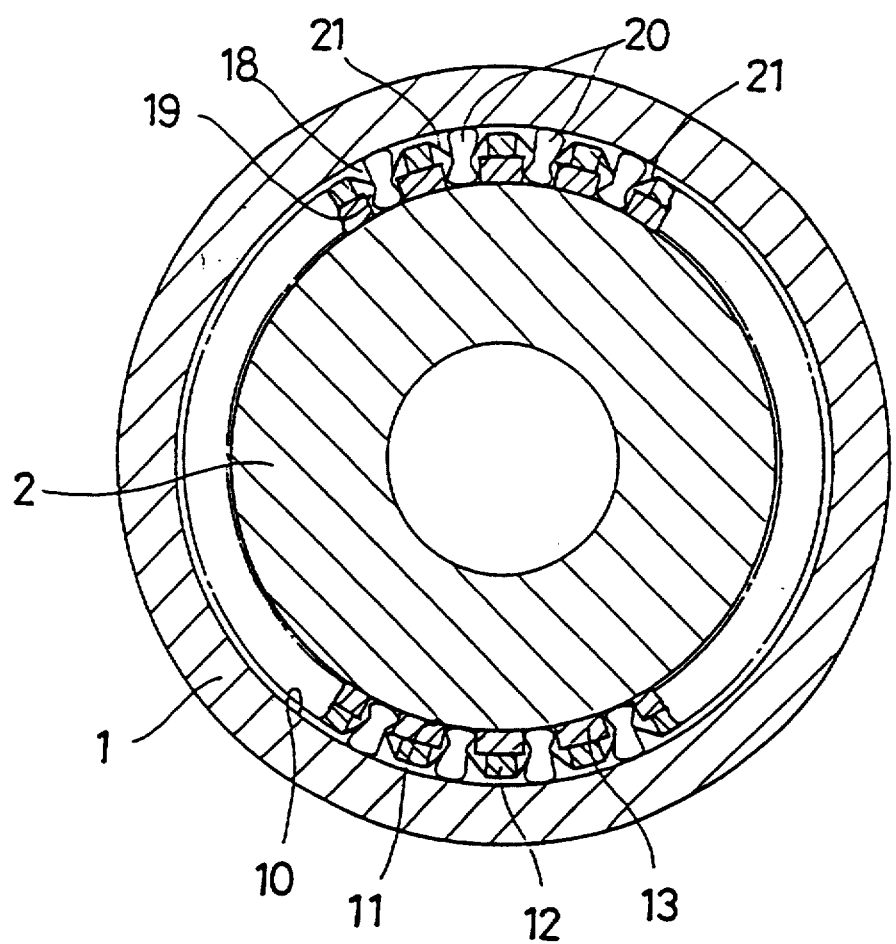
FIG. 3 is a sectional view taken along line III—III of FIG. 1.
Figure 6:
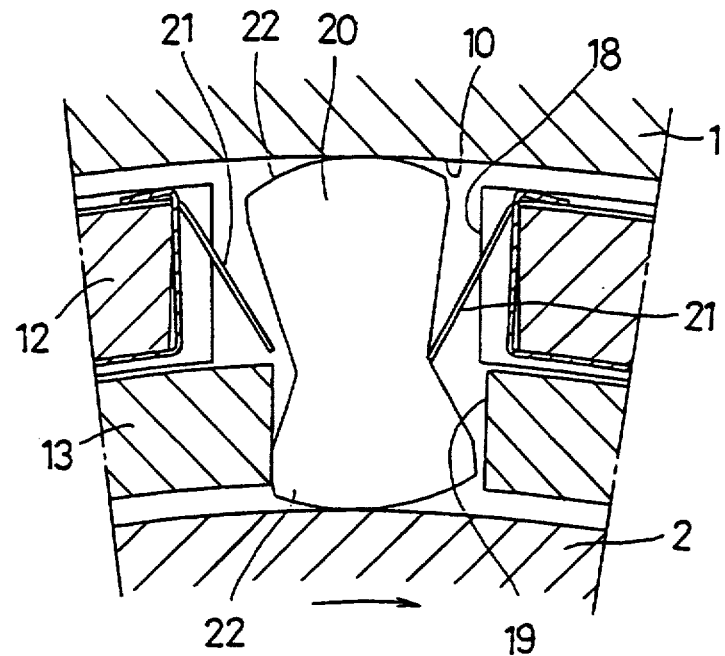
FIG. 6 is a sectional view of a sprag of the same in its engageable position.

As shown in FIGS. 3 and 6, concentric cylindrical surfaces 10 and 11 are formed on the inner periphery of the outer ring 1 and the outer periphery of the inner member 2, respectively. A large-diameter retainer 12 and a small-diameter retainer 13 are mounted between the cylindrical surfaces 10 and 11.

The large-diameter retainer 12 is provided with an integral extension arm 14 on its rear end. The extension arm 14 is rotatably supported between the outer ring 1 and the inner member 2 through bearings.

On the other hand, the small-diameter retainer 13 is provided at its front end with an inwardly bent portion 15 which is kept in slidable contact with an end face 2a of the inner member 2. A spring 16 is provided between the bent portion 15 and a retaining ring 17 for the bearing 3 (lefthand one) to bias the bent portion 15 against the end face 2a of the inner member 2. The biasing force of the spring 16 produces a frictional force between them, which serves to keep the small-diameter retainer 13 pressed against the inner member 2.

As shown in FIGS. 3 and 6, a plurality of diametrically opposite pockets 18 and 19 are formed in the large-diameter retainer 12 and the small-diameter retainer 13, respectively. In each pair of pockets 18 and 19 is received a sprag 20 as an engaging element and springs 21 for holding the sprag 20 in position.

The sprags 20 have on their outer and inner sides symmetrical arcuate surfaces 22 having their centers of curvature located on the central axis of the sprags. Thus, when they are inclined in either direction by a predetermined angle, they will engage both of the cylindrical surfaces 10 and 11, thus coupling the outer ring 1 and the inner member 2 together. The springs 21 have one end thereof supported on the large-diameter retainer 12 to urge the sprags 20 from both sides, keeping them so that they will engage the cylindrical surfaces 10 and 11 if the retainers 12 and 13 rotate relative to each other.

Figure 1:
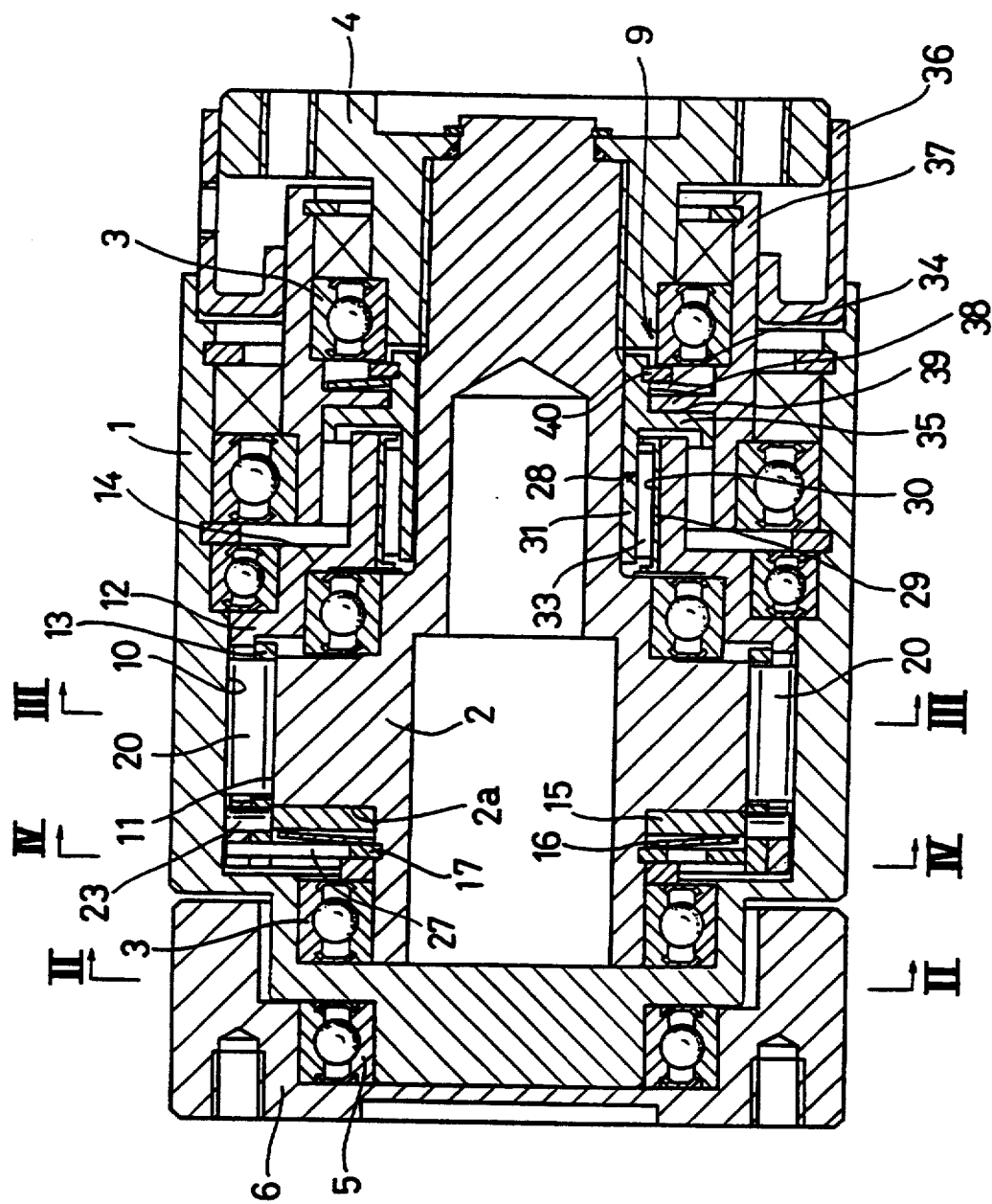
FIG. 1 is a sectional view of a first embodiment.
Figure 4:
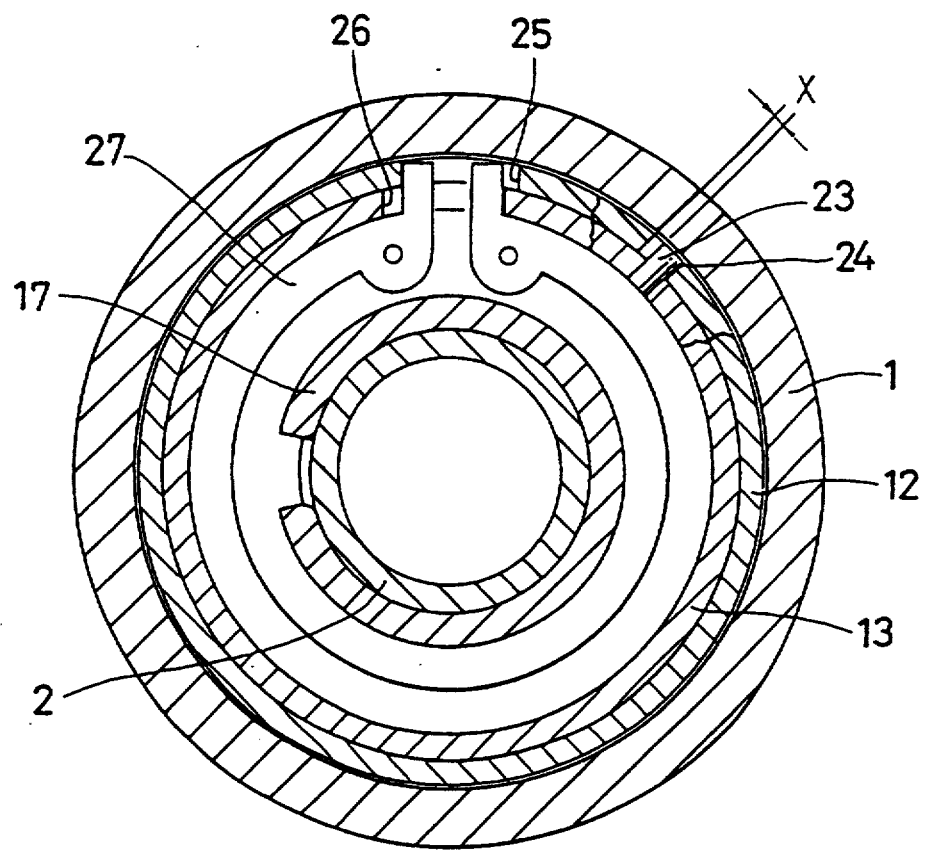
FIG. 4 is a sectional view taken along line IV—IV of FIG. 1.

As shown in FIGS. 1 and 4, the small-diameter retainer 13 carries at its front end a stopper pin 23 received in a square hole 24 formed in the large-diameter retainer 12 with a gap X formed between the wall of the square hole 24 and the pin 23 in the direction of rotation. The gap X is smaller than the rotational-direction plays Y between the outer ring 1 and the coupling member 6 (X<Y).

The large-diameter retainer 12 and the small-diameter retainer 13 have slits 25 and 26, respectively, that extend diametrically therethrough (FIG. 4). A switch spring 27 in the form of a C-shaped ring is mounted in a compressed state with its ends engaged in the slits 25, 26. It has one end thereof pressed against the large-diameter retainer 12 and the other end against the small-diameter retainer 13 to bias the retainers 12 and 13 in circumferentially opposite directions. More specifically, the large-diameter retainer 12 is imparted a turning force in a direction opposite to the turning force imparted when a one-way clutch 28 (described later) engages and thus is turned in this direction until the wall of the square hole 24 abuts the stopper pin 23 which is press-fitted in the small-diameter retainer 13.

Figure 7:
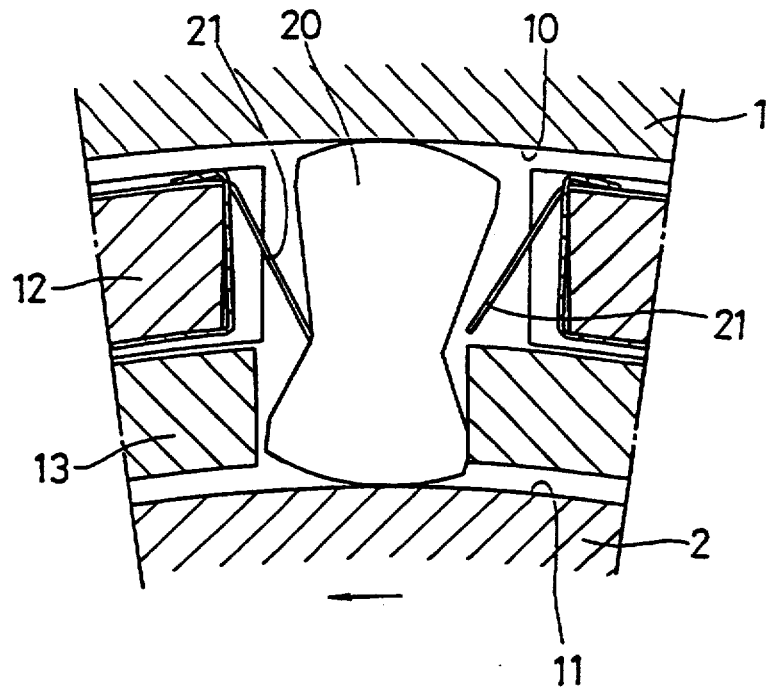
FIG. 7 is a sectional view of a sprag of the same in its opposite engageable position.

The rotational-direction gap X provided between the stopper pin 23 and the square hole 24 is set to be large enough for the sprags 20 to be inclinable to the position shown in FIGS. 6 and 7, i.e. the position in which they engage both of the cylindrical surfaces 10 and 11. The retainers 12 and 13 are urged in opposite directions to each other by the switch spring 27, so that the sprags 20 are in such a position as to engage when the inner member rotates during the vehicle forward travelling. In this embodiment, the switch spring 27 serves as one means for producing a turning effort.

Figure 5:
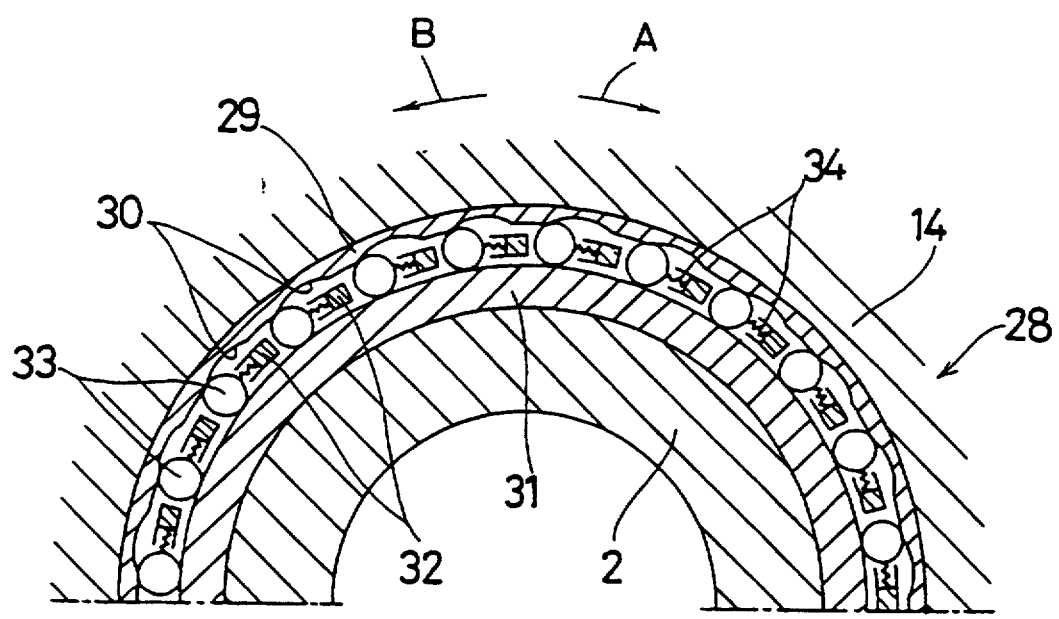
FIG. 5 is a sectional view of the one-way clutch of the same.

On the other hand, the one-way clutch 28 is mounted at the rear end of the extension arm 14 of the large-diameter retainer 12. It serves to selectively connect and disconnect the large-diameter retainer 12 to and from a turning effort generating means (which will be described later). As shown in FIG. 5, the one-way clutch 28 has a clutch outer ring 29 press-fitted in the rear end of the extension arm 14 and formed with a plurality of inclined cam surfaces 30 on the inner periphery thereof at equal intervals. An annular retainer 32 is provided between the clutch outer ring 29 and an inner ring 31. The retainer 32 is formed with pockets in which are received rollers 33 as engaging elements and springs 34 for urging the rollers 33 against the inclined cam surfaces 30 and the inner ring 31.

The one-way clutch 28 is so designed that when the large-diameter retainer 12 is rotated in the direction of arrow A of FIG. 5, the rollers 33 will wedge in between the cam surfaces 30 and the extension arm 14, locking the large-diameter retainer 12 to the inner ring 31 of a turning effort imparting means 9. In contrast, when the large-diameter retainer 12 is rotated in the direction of arrow B of FIG. 5, the rollers 33 will disengage the large-diameter retainer 12 from the inner ring 31.

As shown in FIG. 1, the turning effort imparting means 9 comprises a flange 35 of the inner ring 31, a flange 38 of a housing 37 secured to the car body through a dust cover 36, the flanges 35 and 38 being kept in frictional contact with each other at a frictional contact portion 39, and a disc spring 34 mounted between the flange 38 and a retaining ring 40 to urge the frictional contact portion 39.

The bias of the disc spring 34 is so set that a predetermined frictional force will be produced at the frictional contact portion 39. It acts as a dragging torque that tends to lag the rotation of the inner ring 31, which otherwise tends to rotate together with the large-diameter retainer 12.

The turning effort produced at the frictional contact portion 39 is set to be greater than the turning effort applied to the large-diameter retainer 12 by the biasing force of the switch spring 27. When the one-way clutch 28 gets locked and the large-diameter retainer 12 begins to rotate together with the inner ring 31, the turning effort produced at the frictional contact portion 39 will overcome the turning effort applied by the switch spring 27. The phase relation between the large-diameter retainer 12 and small-diameter retainer 13 is thus reversed.

Figure 19:
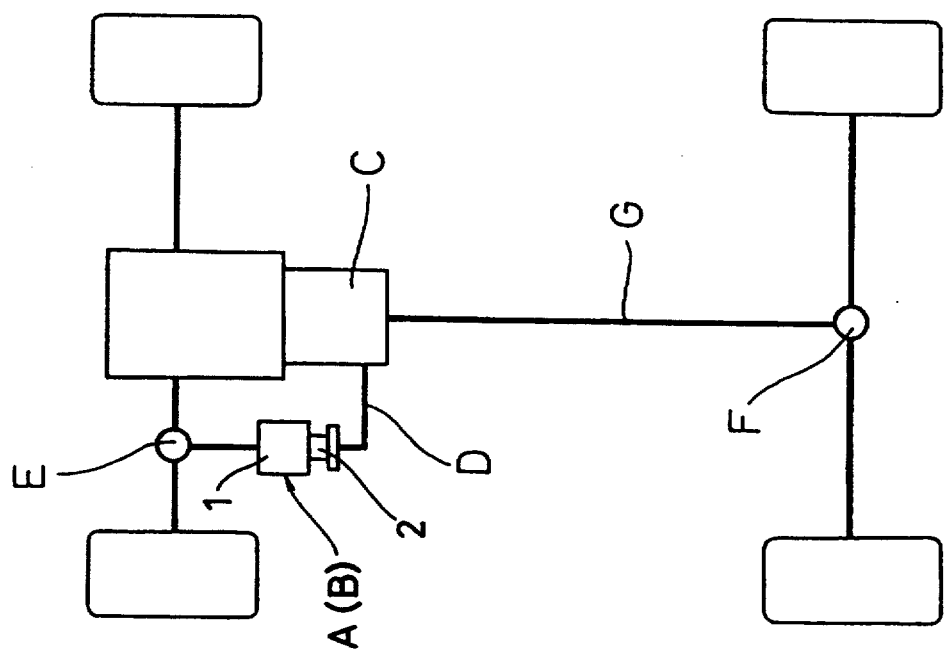

When mounting the device A of this embodiment on the drive train of a vehicle shown in FIG. 19, the input ring 4 of the inner member 2 is coupled to a front wheel propeller shaft D extending from a transfer C and the coupling member 6 to a front differential E.

It is mounted so that while the vehicle is moving forward, the inner member 2 will rotate in such a direction that the one-way clutch 28 disengages and while it is moving backward, it will rotate in such a direction that the one-way clutch 28 gets locked.

When the vehicle begins to move forward in this state, the inner member 2 begins to rotate by the transfer C. The small-diameter retainer 13, fixed to the inner member 2, will rotate together with it. The large-diameter retainer 12, biased by the switch spring 27, begins to rotate after the small-diameter retainer 13 has turned a distance equal to the rotational-direction gap X between the square hole 24 and the stopper pin 23. The sprags 20 will be tipped to the forward-travel ready-to-engage position shown in FIG. 6. In this state, since the one-way clutch 28 is not locked, the turning effort imparting means 9 idles relative to the large-diameter retainer 12.

On the other hand, when the vehicle is moved backward, the inner member 2 and the small-diameter retainer 13 begin to rotate. The large-diameter retainer 12, biased by the switch spring 27, tends to rotate simultaneously. But the moment the retainer 12 begins to rotate in this direction, the one-way clutch 28 will lock, so that the turning effort produced in the turning effort imparting means 9 is now applied to the large-diameter retainer 12. The retainer 12 thus lags relative to the retainer 13. Since the phase relation between the retainers 12 and 13 is reversed while the vehicle is moving backward, the sprags are tipped to a backward-travel ready-to-engage position as shown in FIG. 7.

In an actual driving situation, while the vehicle is moving straight ahead or backward without slipping, the coupling member 6, outer ring 1 and inner member 2 rotate at the same speed, so that the sprags 20 are kept in one of the two opposite ready-to-engage positions. Also, a predetermined play exists between the coupling member 6 and the outer ring 1. Thus, no driving force is transmitted from the inner member 2 to the outer ring 1 and the coupling member 6. The vehicle is driven only by the rear two wheels.

Figure 8:
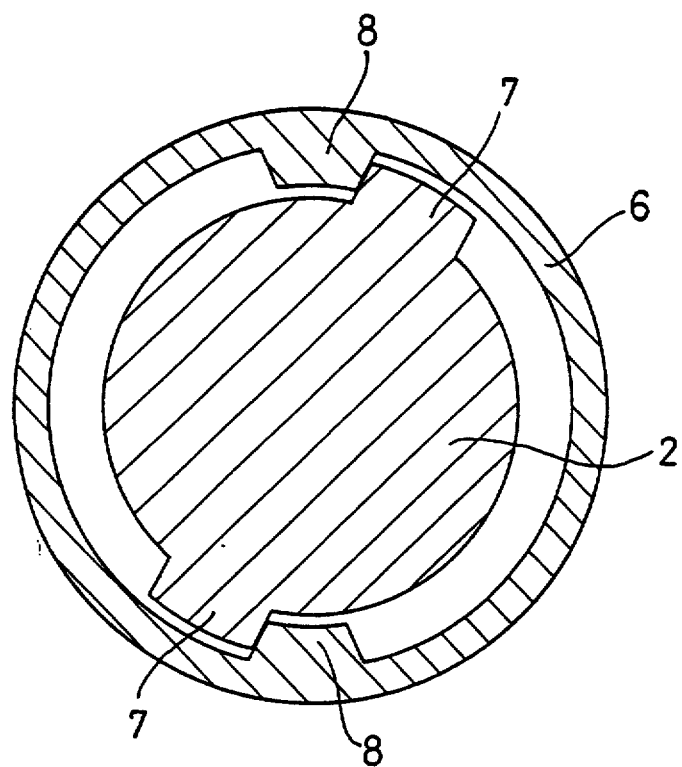
FIG. 8 is view showing how the outer ring and the coupling member engage each other.
Figure 9:
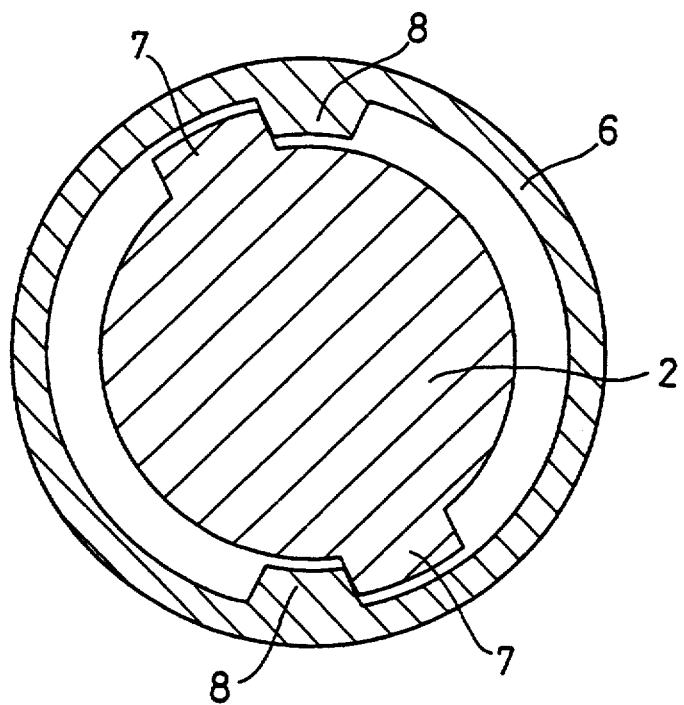
FIG. 9 is a view showing the state when they engage in the opposite way.

While the vehicle is turning, the front wheels and the adaptor coupled thereto will rotate faster than the rear wheels. Thus, the coupling member 6 tends to rotate faster than the outer ring 1 until the plays in the rotational direction disappear as shown in FIG. 8. Thereafter, the outer ring 1 will be rotated together with the coupling member 6. In other words, the outer ring 1 rotate faster than the inner member 2, so that the sprags will not engage, allowing the front wheels to rotate separately from the rear wheels. Thus, no braking will occur when turning a tight corner.

On the other hand, if one of the rear wheels should slip while traveling, the inner member 2, coupled to the transfer, will begin to rotate faster than the front wheels. This causes the sprags 20 to instantly engage both the cylindrical surfaces 10 and 11, thus interlocking the inner member 2 and the outer ring 1 together. Also, the plays between the coupling member 6 and the outer ring 1 disappear, i.e. the protrusions 7 and 8 abut, so that the driving force is transmitted to the front wheels. In other words, the driving mode is switched to four-wheel drive. When the vehicle comes to a stop in this state, transmission of driving force to the front wheels is cut off, so that the coupling member 6 and the outer ring 1 rotate relative to each other so that the rotational-direction plays reappear therebetween.

When the vehicle is brought to a stop and then restarted in the opposite direction, the front wheels (coupling member) may begin to rotate slightly before do the rear wheels. Even if this occurs, the outer ring 1 will not begin to rotate until the rotational-direction plays between the coupling member 6 and the outer ring 1 disappear. Thus, by the time the outer ring 1 begins to rotate, the inner member 2 will be already rotating, so that the phase relation between the large-diameter retainer 12 and the small-diameter retainer 13 has been reversed. Thus, the sprags 20 have already inclined in the opposite direction before the outer ring 1 begins to rotate.

In a rotation transmission device of the type in which the sprags 20 are inclined in either direction by the rotation of the inner member 2, it is important that the inner member 2 start rotating before the outer ring 1 does whenever the travel direction of the vehicle is reversed. This is achieved by providing a suitable amount of rotational-direction play between the coupling member 6, coupled to the output side, and the outer ring 1, coupled to the coupling member 6. With this arrangement, it is possible to smoothly change over the positions of the large-diameter retainer 12 and the sprags 20.

Figure 20:
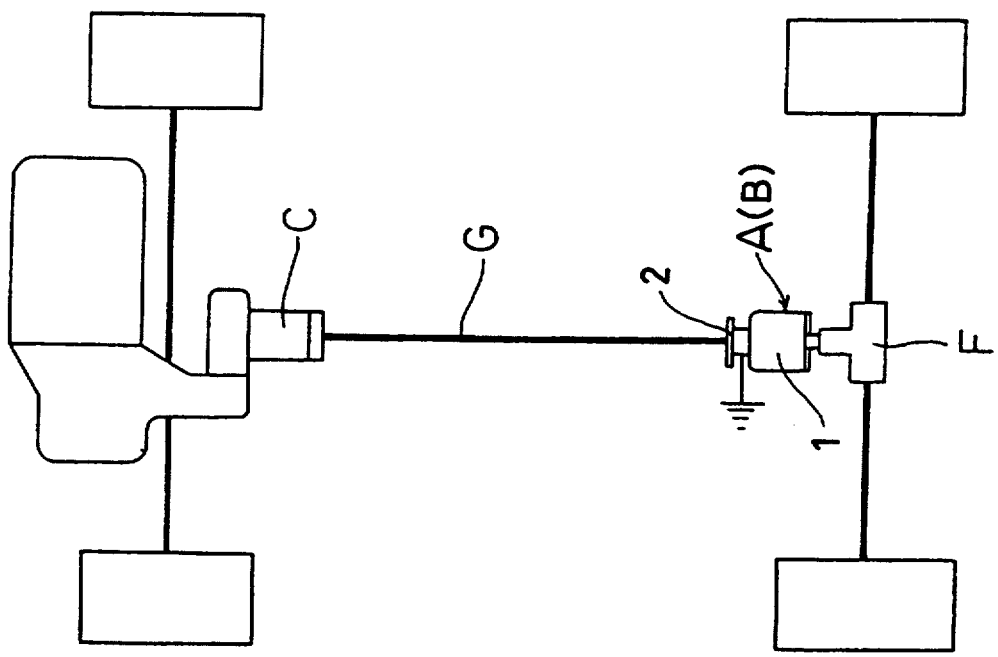
FIGS. 19-22 are schematic views showing different drive trains of a vehicle.

On the other hand, when mounting this device A on the drive train of the vehicle shown in FIG. 20, the input ring 4 of the inner member 2 is coupled to the rear wheel propeller shaft G, which extends from the transfer C, and the coupling member 6 to the rear differential F.

In this case, the operation of the device is slightly different from when mounted in the manner as shown in FIG. 19. If the main driven wheels (front wheels) should slip, the rotational-direction plays between outer ring 1 and coupling member 6 will disappear, so that the driving force is transmitted from the inner member 2 to the outer ring 1 and then to the coupling member 6. The vehicle is now driven on four-wheel drive mode. While the vehicle is at a stop, the rotational-direction plays will reappear between the outer ring 1 and the coupling member 6.

Figure 10:
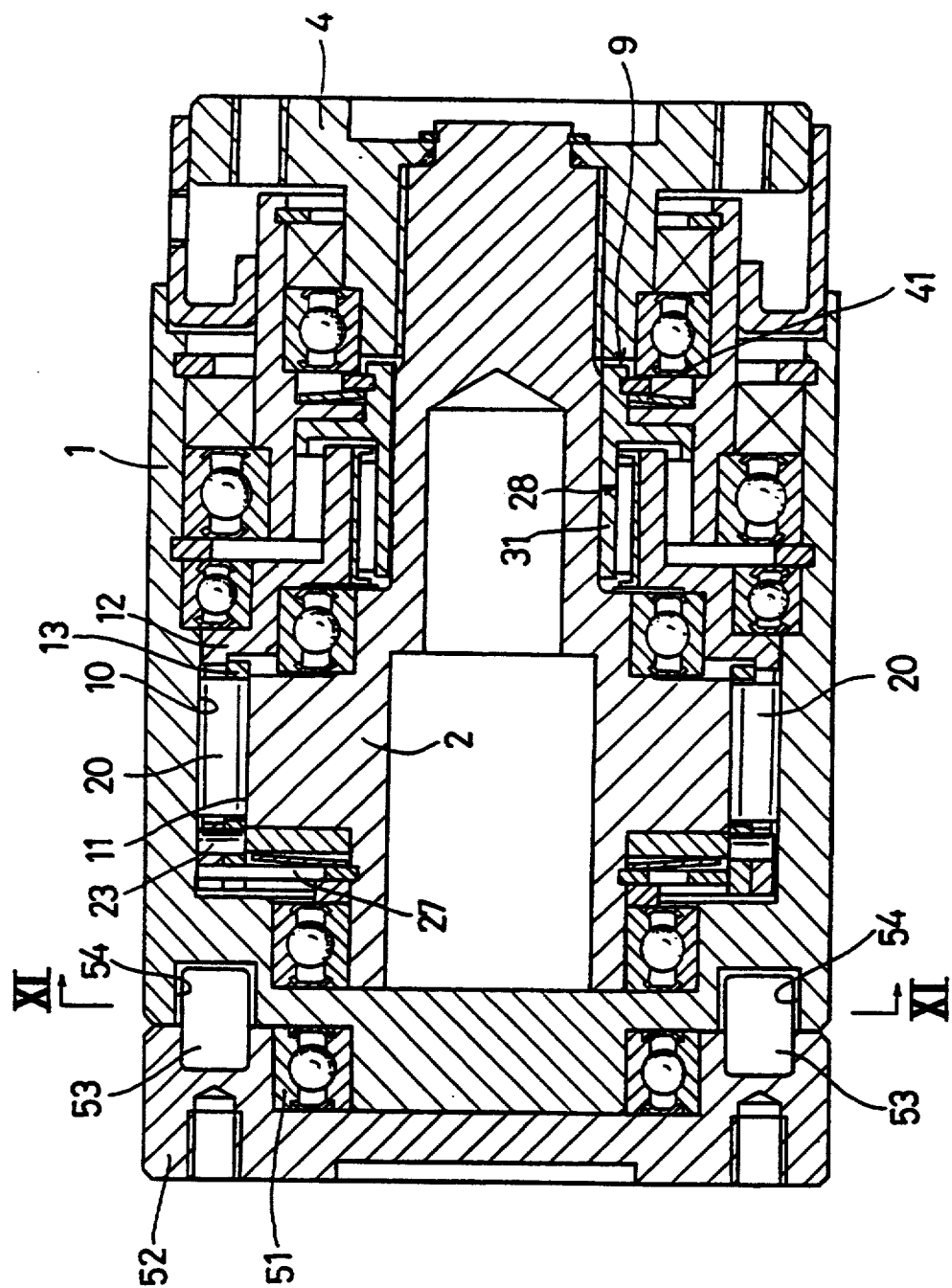
FIG. 10 is a sectional view of a second embodiment.
Figure 11:
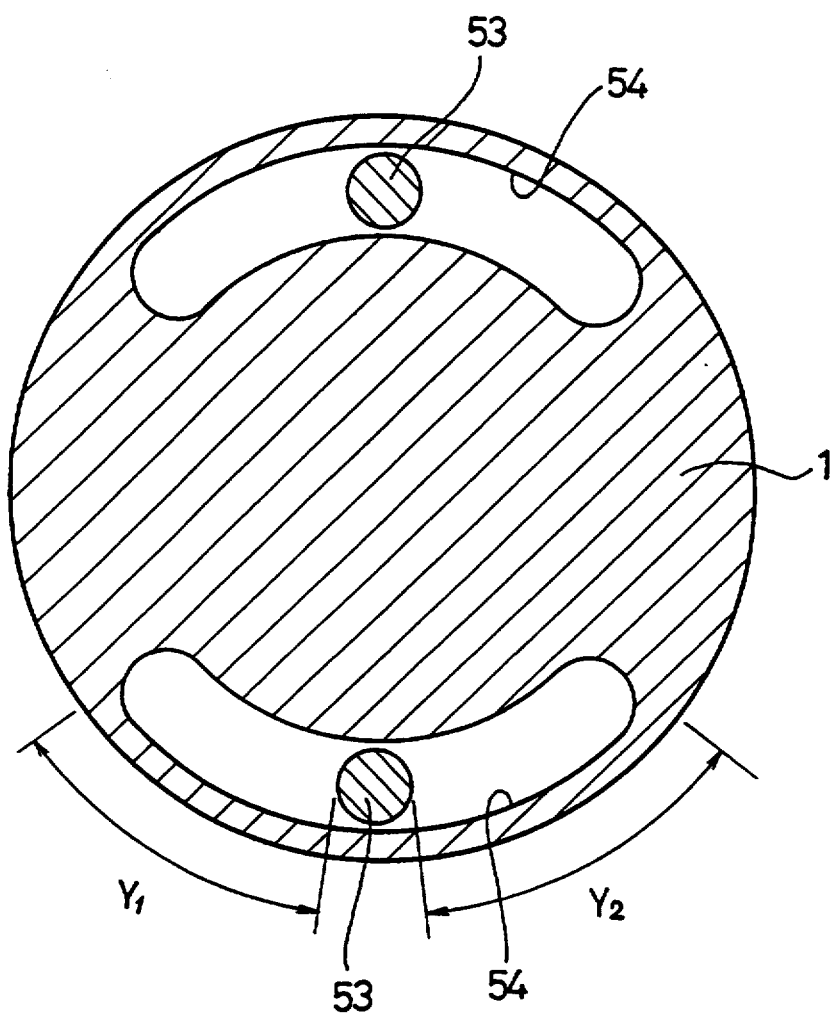
FIG. 11 is a sectional view taken along line XI—XI of FIG. 10.

FIGS. 10 and 11 show the second embodiment in which a coupling member 52 is rotatably mounted on the outer end of the outer ring 1 through a bearing 51. Pins 53 press-fitted in the coupling member 52 extend axially so as to be received in arcuate grooves 54 formed in the end face of the outer ring 1. Plays Y1 and Y2 are provided between the respective pins 53 and the walls of the grooves 54 in the direction of rotation. The outer ring 1 and the coupling member 52 are thus rotatable together through a play Y (=Y1+Y2) that is provided therebetween in the rotational direction.

The second embodiment is the same in its structure and function as the first embodiment. Thus, the same elements are denoted by the same numerals and their description is omitted.

FIGS. 12 through 16 show the third embodiment, in which rollers are used as the engaging elements instead of sprags.

An outer ring 61 is formed with a cylindrical surface 66 on its inner periphery. An inner member 62 is formed on its outer periphery with a plurality of flat cam surfaces 67 at predetermined intervals so as to be opposite to the cylindrical surface 66. Between each cam surface 67 and the cylindrical surface 66 of the outer ring 61 is defined a wedge-shaped space that gradually narrows toward both ends thereof.

A coupling member 63 is rotatably mounted on the outer end of the outer ring 61. It is provided with protrusions 64 which are adapted to be brought into contact with protrusions 65 formed on the outer ring 61 through plays Y (Y1+Y2) provided in the direction of rotation.

An annular retainer 68 is mounted between the outer ring 61 and the inner member 62 through bearings. The retainer 68 carries stopper pins 70 that fit in pin holes 69 formed in the outer periphery of the inner member 62.

The retainer 68 is formed with as many number of pockets 71 as the cam surfaces 67, which are arranged in the circumferential direction. Each pocket 71 accommodates a roller 72 as an engaging element and springs 73. Namely, one roller 72 is provided for each cam surface 67 on the inner member 62. When the retainer 68 moves a predetermined distance circumferentially, the rollers are adapted to engage both the cam surfaces 67 and the cylindrical surface 66, thus locking the outer ring 61 and the inner member 62 together. The springs 73 are mounted between the rollers 72 and the side walls of the pockets 71 to urge the rollers 72 from both sides to their neutral position where they are not in engagement with either the cylindrical surface 66 or the cam surfaces 67. When the retainer 68 moves a predetermined distance circumferentially from this state, only the force of the springs on one side of the rollers 72 will act on the rollers, thus pushing them against the engaging surfaces.

Figure 12:
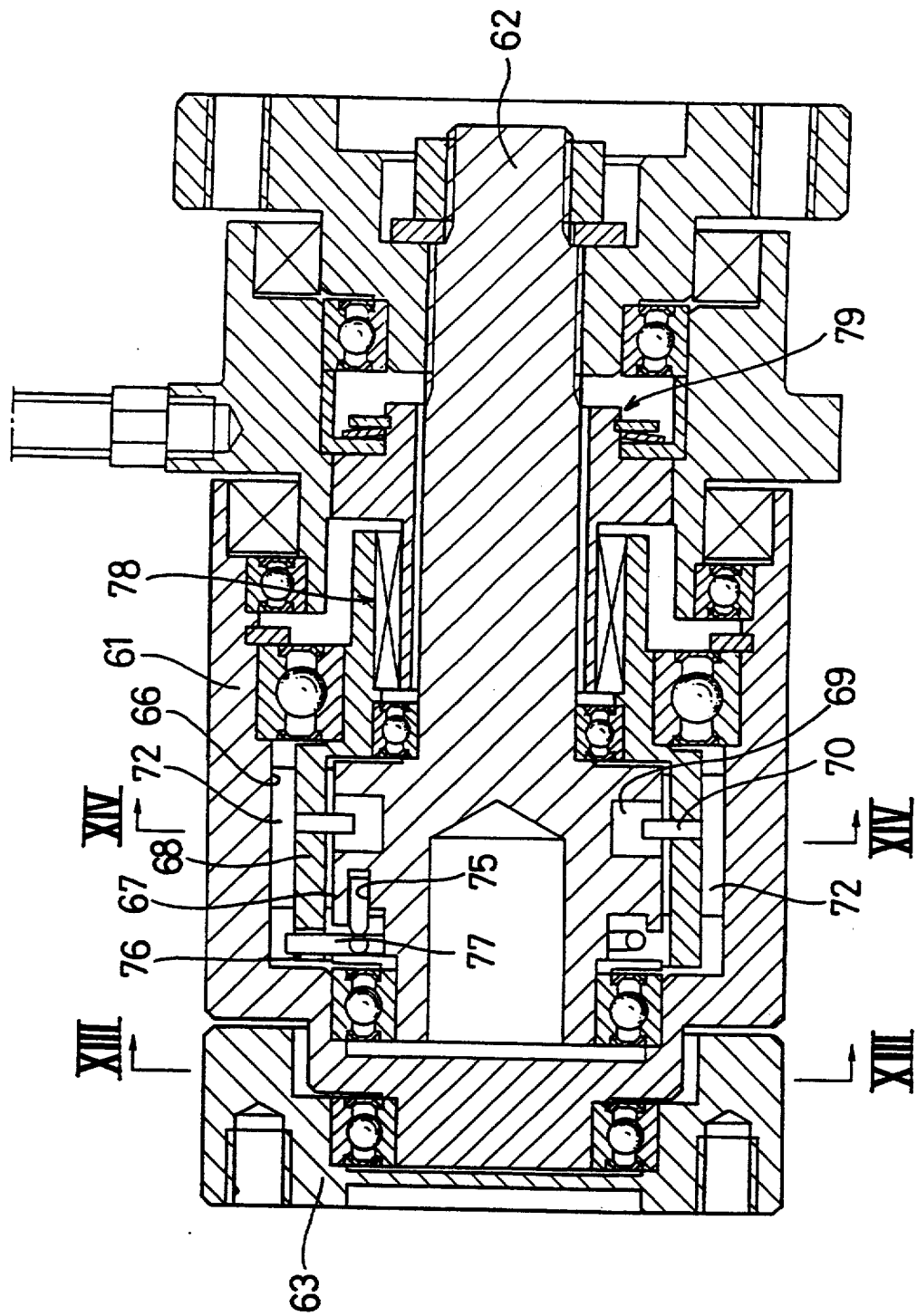
FIG. 12 is a sectional view of a third embodiment.
Figure 13:
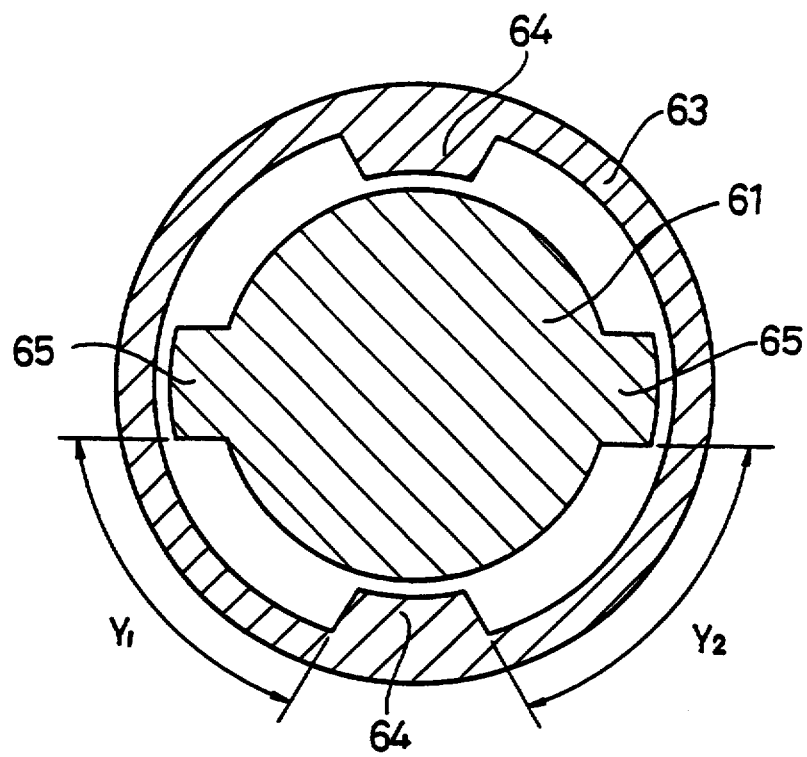
FIG. 13 is a sectional view taken along line XIII—XIII of FIG. 12.

In the end of the retainer 68 is formed a cutout 76 (FIG. 12). A torsion coil spring 77 is mounted between the retainer 68 and the inner member 62 and has its both ends engaged in the cutout 76 and a spring seat 75 formed in the inner member 62. The retainer 68 is biased by the coil spring 77 so as to turn in the direction opposite to the direction in which the inner member 62 rotates during the vehicle forward travelling.

A one-way clutch 78 is press-fitted into one end of the retainer 68. A turning effort imparting means 79 is coupled to the one-way clutch 78. They are the same in structure and function as the one-way clutch 28 and the turning effort imparting means used in the first embodiment. Thus, the same elements are denoted by the same numerals and their description is omitted.

Figure 14:
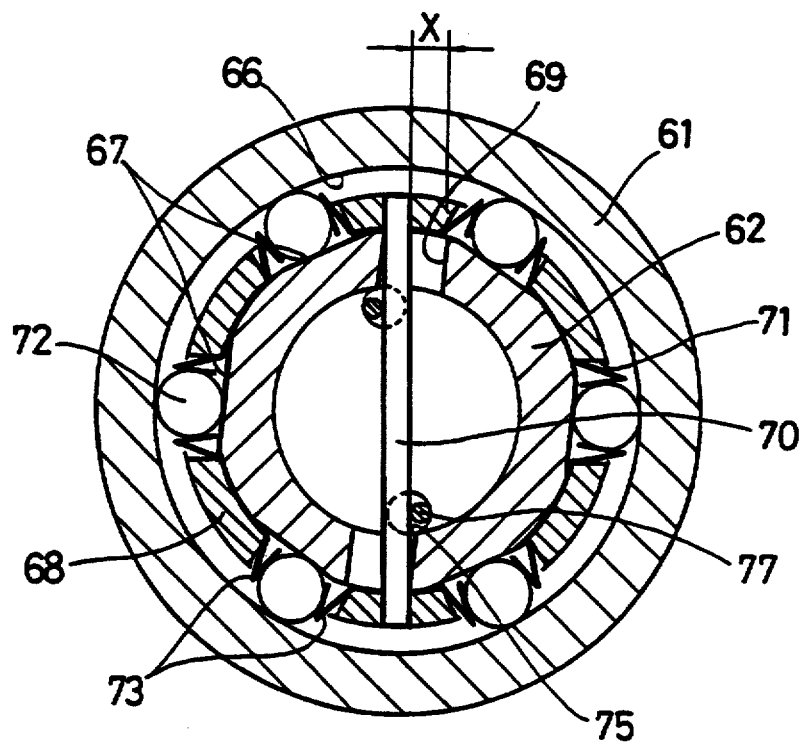
FIG. 14 is a sectional view taken along line XIV—XIV of FIG. 12.
Figure 15:
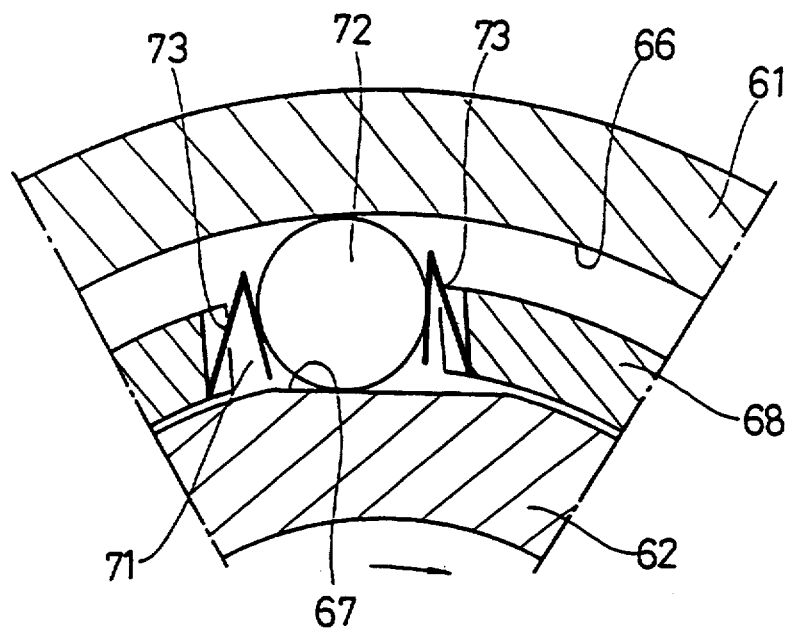
FIG. 15 is a sectional view showing the state when the roller is in its engageable position.
Figure 16:
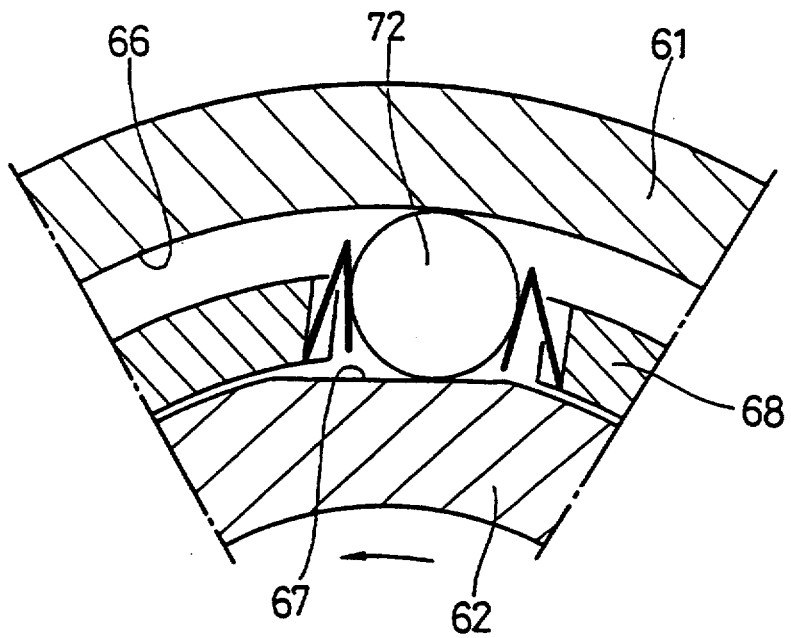
FIG. 16 is a sectional view showing the state when in its opposite engageable position.

As shown in FIG. 14, the retainer 68 carries stopper pins 70 that loosely fit in pin holes 69 formed in the peripheral surface of the inner member 62 with gaps X being provided therebetween in the direction of rotation The gaps X are set to be larger than the distance by which the rollers 72 move from their neutral position to a ready-to-engage position where they come into engagement with both the cam surfaces 67 and the cylindrical surface 66.

The rotation transmission device of the third embodiment is mounted on a vehicle as shown in FIG. 19 by coupling the inner member 62 to the front wheel propeller shaft D and the coupling member 63 to the front differential E. When the vehicle begins to move forward, the inner member 62 will begin to rotate, driven by the transfer C. The retainer 68, biased by the torsion coil spring 77, begins to rotate after the inner member has rotated a distance equal to the size of the rotational-direction gaps X between the pin holes 69 and the stopper pins 70. The rollers 72 are thus moved to the position shown in FIG. 15, i.e. to the forward-travel ready-to-engage position.

On the other hand, when the vehicle begins to move backward, the inner member 62 is rotated first. The retainer 68, biased by the torsion coil spring 77, tends to rotate together with the inner member 62. But the moment the retainer 68 begins to rotate in this direction, the one-way clutch 78 will engage, so that the turning effort produced in the turning effort imparting means 79 is now applied to the retainer 68. The retainer 68 thus lags relative to the inner member 62. Since the phase relation between the inner member 62 and the retainer 68 is reversed while the vehicle is moving backward, the rollers are now moved to the backward-travel ready-to-engage position shown in FIG. 16.

When the vehicle is brought to a stop and then restarted in the opposite direction, the front wheels (coupling member 63) may begin to rotate slightly before do the rear wheels. Even if this occurs, however, the outer ring 1 will not begin to rotate until the rotational-direction plays Y between the coupling member 63 and the outer ring 61 disappear. Thus, by the time the outer ring 61 begins to rotate, the inner member 62 will have already started rotating, so that the phase relation between the retainer 68 and the inner member 62 and thus the position of the rollers 72 have been reversed.

Figure 17:
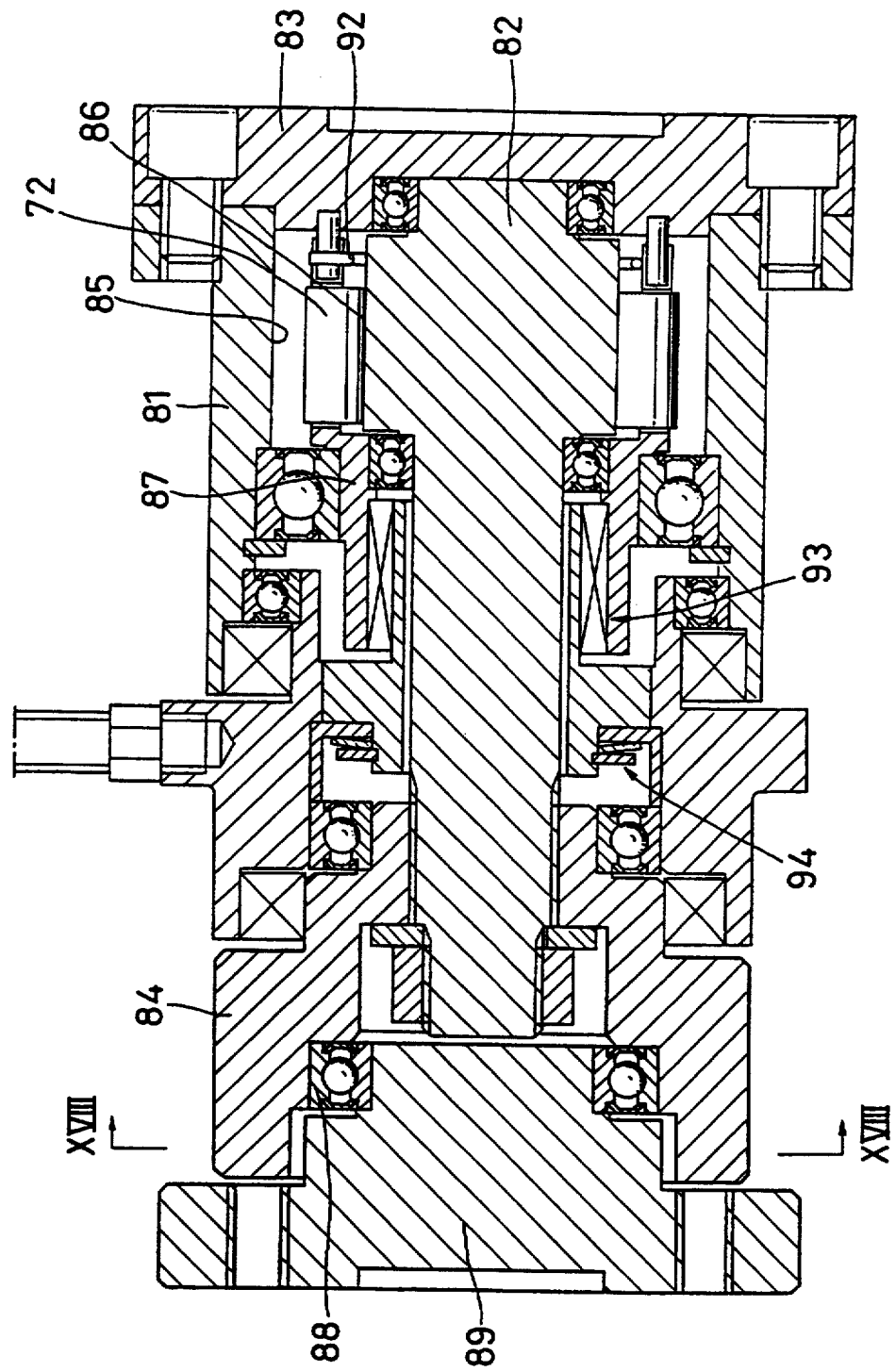
FIG. 17 is a sectional view of a fourth embodiment.
Figure 18:
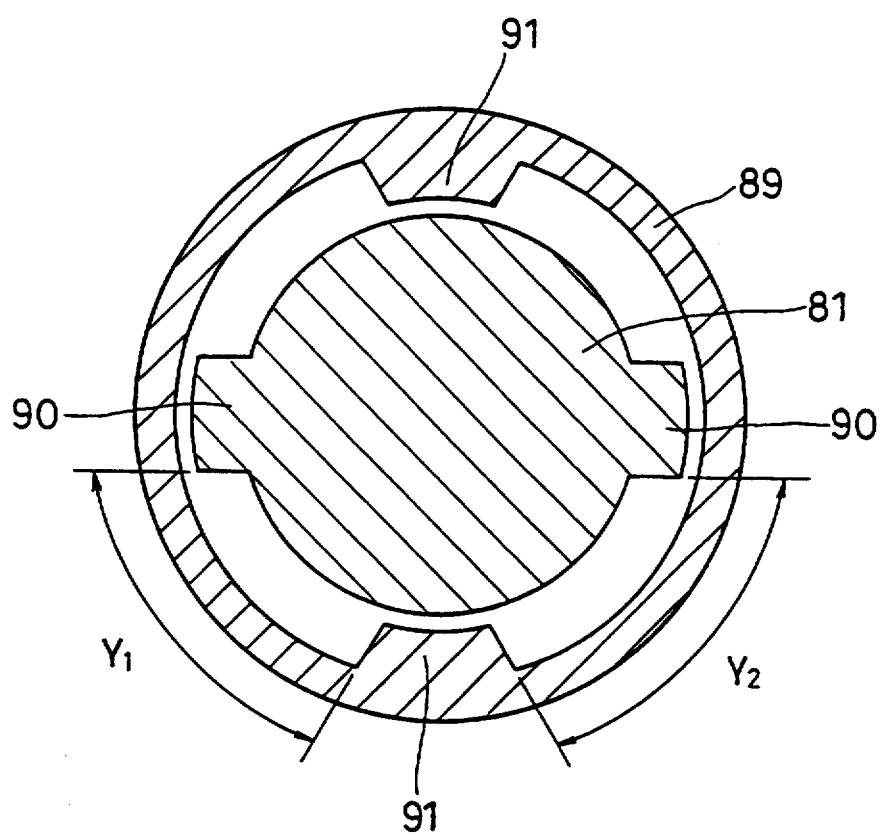
FIG. 18 is a sectional view taken along line XVIII—XVIII of FIG. 17.

FIGS. 17 and 18 show the fourth embodiment in which, in contrast to the above-described embodiments, the outer ring is the input member and the inner member is the output member. Thus, an outer ring 81 carries an input flange 83 at one end, while an inner member 82 carries an output ring 84 at one end.

A coupling member 89 is rotatably mounted in the end of the output ring 84 through a bearing 88. The coupling member 89 and the output ring 84 are formed with protrusions 90 and 91, respectively, (FIG. 18) with plays Y (=Y1+Y2) provided therebetween in the direction of rotation, so as to be movable into contact with each other.

The outer ring 81 has on its inner periphery a plurality of cam surfaces 85, having a polygonal section as a whole (The structure is the same as shown in FIG. 14). A cylindrical surface 86 is formed on the outer periphery of the inner member 82 so as to be opposite to the cam surfaces 85. An annular retainer 87 is mounted between the cylindrical surface 86 and the cam surfaces 85 so as to be rotatable relative to the outer ring 81. It is formed with pockets in which are received rollers 72 adapted to engage the cam surfaces 85 and the cylindrical surface 86 when moved in either direction and springs for holding the rollers 72 in neutral position.

To one end of the retainer 87 is mounted a torsion coil spring 92 for producing turning effort. To the other end is coupled a turning effort imparting means 94 through a one-way clutch 93.

Figure 22:
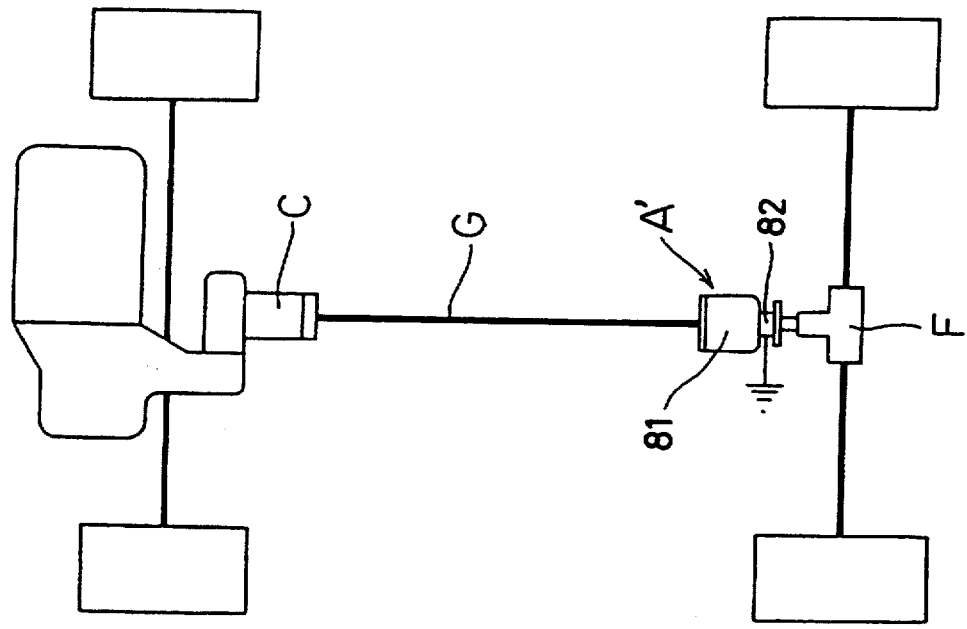
Figure 21:
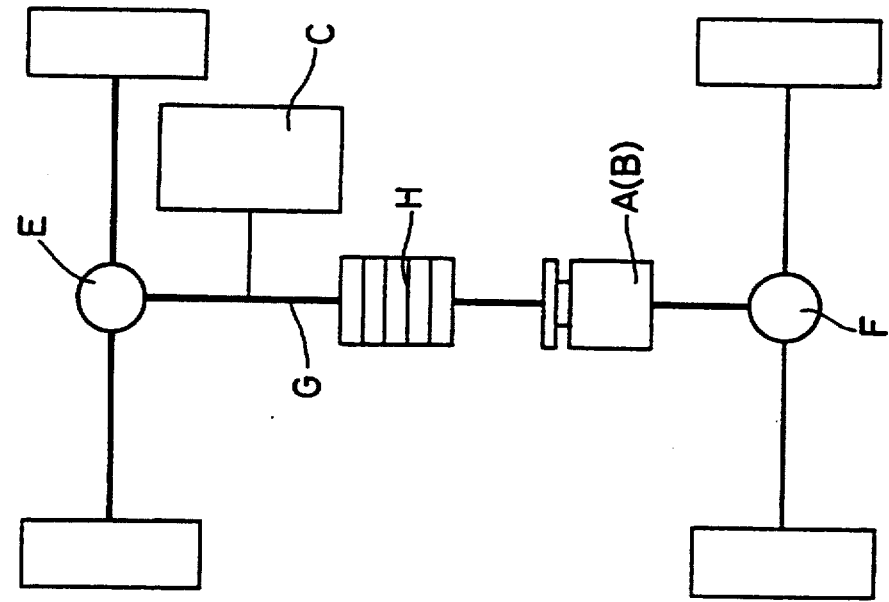
Figure 23:
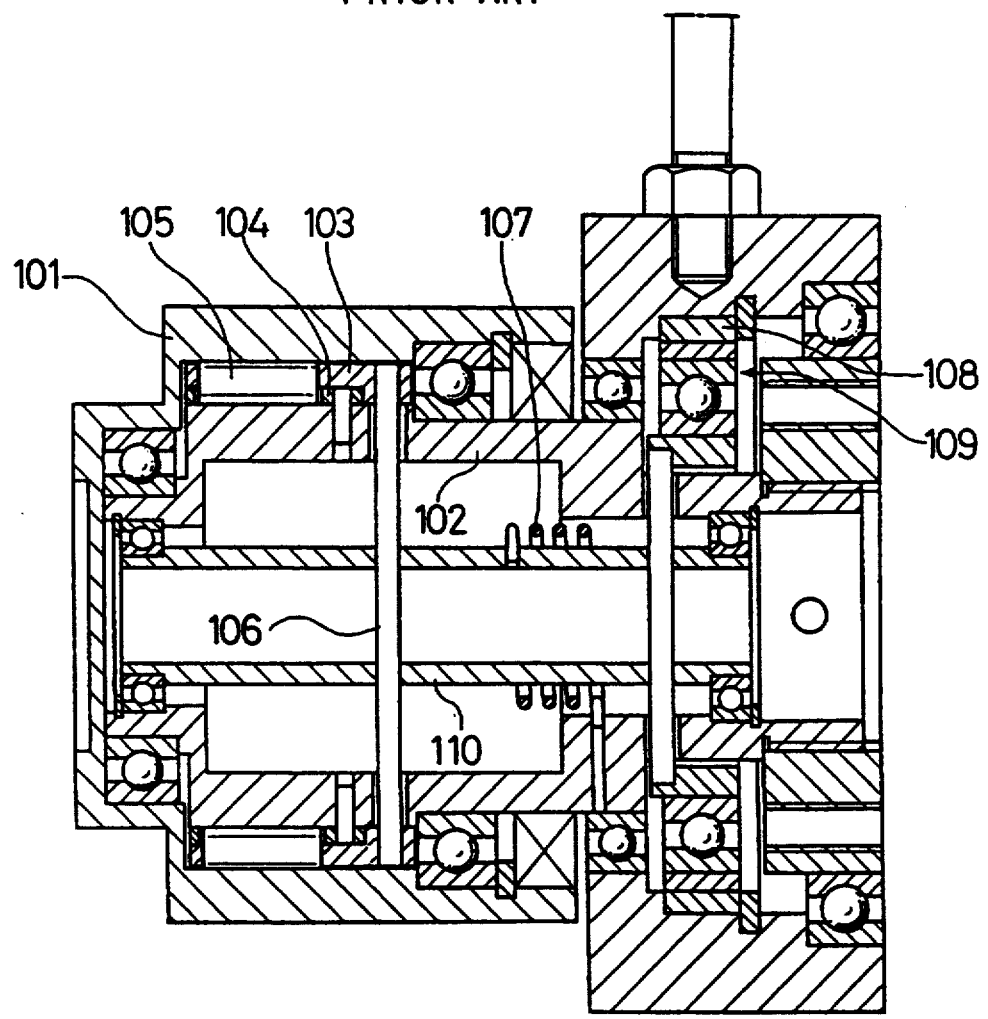
FIG. 23 is a sectional view of a prior art device.
Figure 24:
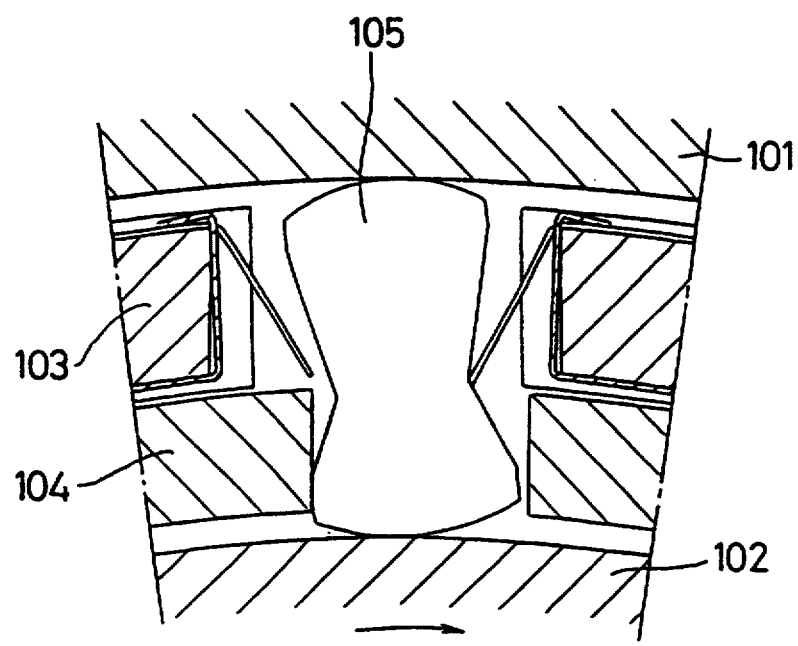
FIG. 24 is a sectional view of the same showing how the sprags operate.

The rotation transmission device A' of the fourth embodiment is mounted on the drive train of a vehicle shown in FIG. 22 by coupling the input flange 83 of the outer ring 81 to the rear wheel propeller shaft G and the output ring 84 of the inner member 82 to the rear differential F through the coupling member 89 (in which case, the transmission device A' is mounted in the opposite position to the mounting position of the device A shown in FIG. 20).

In any of the above embodiments, the turning effort imparting means, which serves to create a rotational difference between the retainer and the inner member or between the retainer and the outer ring, may comprise a disc spring and a friction pad as described above or may be in the form of a speed reducing gear train.

What is claimed is:

1. A rotation transmission device comprising a driving member coupled to an input shaft, a driven member coupled to an output shaft, one of said driving member and said driven member mounted around the other so as to be rotatable relative to each other, a plurality of engaging elements mounted between said driving member and driven member and engaging and locking both said driving and driven members together when said driving member and said driven member rotate relative to each other in either direction, a retainer means for keeping said engaging elements circumferentially spaced apart a predetermined distance from each other, said retainer means being coupled to said driving member so as to rotate together with said driving member, with a play in the circumferential direction left between the entire portion or a part of said retainer means and said driving member to allow them to rotate relative to each other, two turning effort imparting means for imparting a turning effort to said retainer means from opposite directions, and a changeover means for changing over the direction of the turning effort applied to said retainer means according to the direction of rotation of said driving member, characterized in that said driven member is coupled to an output shaft with a play left therebetween in the direction of rotation, said play between said driven member and said output shaft being larger than said play between said retainer means and said driving member.

2. A rotation transmission device as claimed in claim 1 wherein said engaging elements are sprags having engaging arcuate surfaces at both ends thereof, wherein said driving member and said driven member are formed with concentrical cylindrical surfaces on opposite surfaces thereof, wherein said retainer means comprises a first retainer coupled to said driving member with a play left therebetween in the direction of rotation, and a second retainer held by said driving member, and wherein said first retainer and said second retainer are formed with diametrically opposite pockets in which are received both ends of said sprags.

3. A rotation transmission device as claimed in claim 1 wherein said engaging elements are rollers, and wherein said retainer means is an annular coupled to said driving member with a play provided therebetween in the direction of rotation, said retainer means being formed with pockets in which are received said rollers, wherein a cylindrical surface is formed on one of the opposite surfaces of said driving member and said driven member while a polygonal surface is formed on the other of the opposite surfaces, thereby defining a plurality of wedging spaces between said opposite surfaces, said rollers engaging in said respective wedging positions to lock said members together when said driving member and said driven member rotate in either direction relative to each other.

* * * * *